April 14, 1953

V. L. PRICE 2,634,473

CONTROL CLIP

Filed Nov. 18, 1950

*INVENTOR.*
VERNARD L. PRICE
BY
*HIS AGENT*

Patented Apr. 14, 1953

2,634,473

UNITED STATES PATENT OFFICE 2,634,473

CONTROL CLIP

Vernard L. Price, Chicago, Ill., assignor to Zenith Radio Corporation, a corporation of Illinois Application November 18, 1950, Serial No. 196,436

3 Claims. (Cl. 24—81)

This invention relates to clip devices and more particularly to slide clips for firmly positioning control elements in television apparatus or the like.

In accordance with the invention there is provided a clip constructed to extend through a slot in a wall of a supporting structure to be slidable along the slot and adjust an associated control element. The clip comprises a resilient substantially V-shaped head portion adapted to engage at its open end one surface of the supporting structure, a hook extending from the head portion adapted to pass through the afore-mentioned slot and be biased by the head portion so that its tip engages the opposite surface of the wall, and at least one arm connected to the head portion and extending through the slot beyond the hook for engagement with an extension of the control element.

The invention is readily adaptable for use in conjunction with, for example, the horizontal width and linearity control elements of television receivers. These control elements usually take the form of inductance coils having longitudinally movable cores therein. The clip of this invention may be used to provide a convenient adjustment for these cores so that they may be positioned and rigidly maintained in any selected position.

It is, accordingly, an object of this invention to provide an improved clip for adjusting a control element to any selected position.

A further object of the invention is to provide such an improved clip by means of which a control element may be adjusted to any selected position and firmly but releasably maintained in the selected position.

Yet a further object of the invention is to provide such an improved clip which may be constructed and mounted in a simple and expeditious manner.

Figure 1:
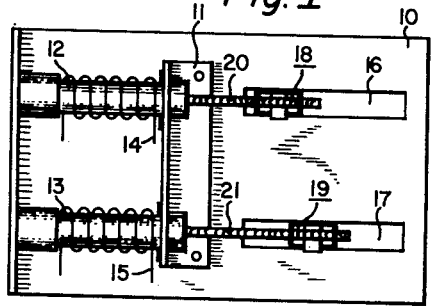
Figure 2:
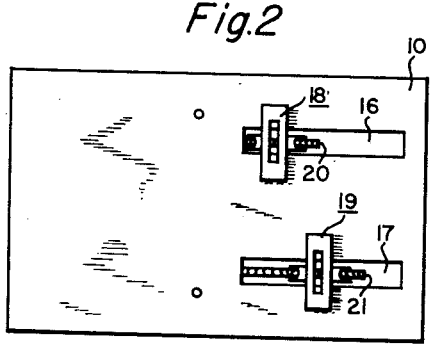
Figure 3:
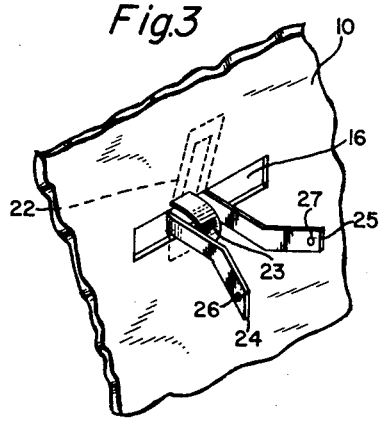
Figure 4:
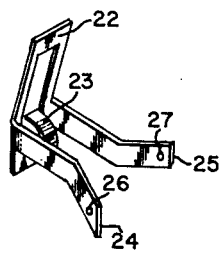

The features of this invention which are believed to be new are set forth with particularity in the appended claims. The invention itself, however, together with further objects and advantages thereof may best be understood by reference to the following description when taken in conjunction with the accompanying drawing, in which:

Figures 1 and 2 show top and bottom views, respectively, of a clip constructed in accordance with the invention in place in the slotted wall of a supporting structure and connected to extensions of associated control elements, Figure 3 shows a perspective view of the clip extending through a slot in a wall of a supporting structure, and, Figure 4 is a perspective view of the clip per se.

Referring to Figures 1 and 2, the control unit illustrated therein includes a supporting structure 10 having a bracket 11 secured thereto. Bracket 11 supports a pair of coil forms 12, 13 having inductance coils 14, 15 respectively wound thereon. The inductance coils may, for example, be connected into the circuit of a television receiver in well-known manner to provide horizontal width and linearity control elements for the receiver. As previously pointed out, the width and linearity of the reproduced image may be adjusted by varying the inductance of coils 14, 15 which, in turn, may be achieved by moving metallic cores (not shown) in coil forms 12 and 13.

The wall of supporting structure 10 is provided with a pair of slots 16, 17, and a pair of clips 18, 19 respectively extend through the slots. These clips are respectively coupled to the cores by means of flexible rods 20, 21 so that movement of the clips along the slots adjusts the longitudinal position of the cores to effect the aforementioned control function in the receiver.

As shown in Figures 3 and 4, the clip comprises a substantially V-shaped resilient head portion 22 which engages the outer surface of the supporting wall at the open end of the V in transverse relation to slot 16. The term V-shaped is intended to refer generically to any suitable configuration of the resilient head which enables it to perform its desired function. As will be appreciated, the head may be actually V-shaped, or arcuate, or the like. A further hook-shaped strip 23 is affixed to head portion 22 and extends through the slot. The tip of hook-shaped strip 23 is biased into firm engagement with the inner surface of wall 10 due to the configuration and resilient nature of the head portion. Hook 23 may conveniently be formed integrally with resilient head portion 22 by punching it out of the center area of the head portion.

A pair of arms 24, 25, which may be formed integrally with resilient head portion 22 extends through the slot on each side of hook 23 and beyond the hook. Arms 24 and 25 may also be resilient in nature and have apertures 26, 27 at their free ends which engage, for example, flexible rod 20. The free ends of arms 24, 25 are preferably bent away from each other to assure a more secure connection with the flexible rod.

The improved clip of this invention may be inserted in slot 16, for example, by merely pressing it into the slot until the tip of the hook 23 snaps through the slot and holds the clip in place. Arms 24 and 25 may be squeezed together and rod 20 inserted through apertures 26, 27. When the arms are released, they spread apart and the rod is securely held within the apertures. To adjust the longitudinal position of the core in inductance coil 14, head portion 22 is pressed towards the wall of structure 10 which relieves the bias on hook 23 and frees it from the inner surface of the wall. The core may then be moved with ease by sliding the clip along the slot until the core is in a selected position. The head portion 22 is then released which causes the hook to be biased against the inner surface of the wall of structure 10, rigidly holding the clip and its associated control element against further movement.

The invention provides, therefore, a clip for adjusting various control elements in a television receiver or the like that may be constructed simply and economically. Moreover, the improved clip of the invention may be inserted into a slot in the wall of a supporting structure and connected to an associated control element in an extremely convenient fashion, and when so connected provides a reliable means for setting the control element.

While a particular embodiment of the invention has been shown and described modifications may be made and it is intended in the appended claims to cover all such modifications as may fall within the true spirit and scope of the invention.

I claim:

1. A resilient clip for supporting an element in an adjustably fixed position with respect to a slot in a supporting structure comprising: a yieldable concavo-convex head portion having at least one of its principal dimensions exceeding the width of said slot; a pair of spaced, similar, parallel arms for receiving an element to be adjusted by said clip having a width approximately equal to the width of said slot, and projecting from opposed edge portions of the concave side of said head portion in the vicinity of the apex thereof; and a yieldable portion of J-shaped configuration positioned between said parallel arms, secured at one end to said head portion and having a free end extending beyond one side of said arms in substantial alignment with the apex of said head portion.

2. A resilient clip for supporting an element in an adjustably fixed position with respect to a slot in a supporting structure comprising: a yieldable concavo-convex head portion having at least one of its principal dimensions exceeding the width of said slot; a pair of spaced, similar, parallel, resilient arms with apertured free ends directed away from one another for receiving an element to be adjusted by said clip having a width approximately equal to the width of said slot, and projecting from opposed edge portions of the concave side of said head portion in the vicinity of the apex thereof; and a yieldable portion of J-shaped configuration positioned between said parallel arms, secured at one end to said head portion and having a free end extending beyond one side of said arms in substantial alignment with the apex of said head portion.

3. A resilient unitary clip for supporting an element in an adjustably fixed position with respect to a slot in a supporting structure comprising: a yieldable concavo-convex head portion having at least one of its principal dimensions exceeding the width of said slot; a pair of spaced, similar parallel arms integral with said head for receiving an element to be adjusted by said clip having a width approximately equal to the width of said slot, and projecting from opposed edge portions of the concave side of said head portion in the vicinity of the apex thereof; and a yieldable portion J-shaped configuration struck out of said head portion and positioned between said parallel arms, said J-shaped portion being integral at one end with said head portion and having a free end extending beyond one side of said arms in substantial alignment with the apex of said head portion.

VERNARD L. PRICE.

References Cited in the file of this patent

UNITED STATES PATENTS

| Number | Name | Date |
| --- | --- | --- |
| 675,063 | Kift | May 28, 1901 |
| 2,041,335 | Hall | Mar. 19, 1936 |
| 2,058,733 | Smith | Oct. 27, 1936 |
| 2,171,925 | Fitts | Sept. 5, 1939 |
| 2,223,622 | Kost | Dec. 3, 1940 |
| 2,340,249 | Murphy | Jan. 25, 1944 |